US011912059B2

(12) United States Patent
Sportel et al.

(10) Patent No.: US 11,912,059 B2
(45) Date of Patent: Feb. 27, 2024

(54) PIGMENT TRANSFER PAPER AND PROCESS FOR TRANSFER TO A TEXTILE SUBSTRATE

(71) Applicant: COLDENHOVE KNOW HOW B.V., Eerbeek (NL)

(72) Inventors: Koert Johannes Sportel, Brummen (NL); Anna Karolina Schenning Stawicka, Wehl (NL); Johannes Willem Jan Bannink, Tonden (NL); Douglas Bruce Troyer, Greenville, SC (US)

(73) Assignee: COLDENHOVE KNOW HOW B.V., Eerbeek (NL)

( * ) Notice: Subject to any disclaimer, the term of this patent is extended or adjusted under 35 U.S.C. 154(b) by 0 days.

(21) Appl. No.: 17/596,813

(22) PCT Filed: Jun. 19, 2020

(86) PCT No.: PCT/NL2020/050395
§ 371 (c)(1),
(2) Date: Dec. 17, 2021

(87) PCT Pub. No.: WO2020/256549
PCT Pub. Date: Dec. 24, 2020

(65) Prior Publication Data

US 2022/0169068 A1 Jun. 2, 2022

(30) Foreign Application Priority Data

Jun. 19, 2019 (NL) ...................................... 2023347

(51) Int. Cl.
*B44C 1/17* (2006.01)
*D06P 1/52* (2006.01)
*D06P 5/24* (2006.01)

(52) U.S. Cl.
CPC .......... *B44C 1/1716* (2013.01); *D06P 1/5285* (2013.01); *D06P 5/007* (2013.01)

(58) Field of Classification Search
None
See application file for complete search history.

(56) References Cited

U.S. PATENT DOCUMENTS 4,351,871 A 9/1982 Lewis et al.
5,798,179 A 8/1998 Kronzer
(Continued)

FOREIGN PATENT DOCUMENTS

DE 2840792 A1 4/1979
EP 0018708 A1 11/1980
(Continued)

OTHER PUBLICATIONS

"International Application Serial No. PCT/NL2020/050395, International Search Report dated Sep. 29, 2020", (Sep. 29, 2020), 5 pgs.
(Continued)

*Primary Examiner* — Laura C Powers
(74) *Attorney, Agent, or Firm* — Schwegman Lundberg & Woessner, P.A.

(57) ABSTRACT

The invention is directed to a pigment transfer sheet (1) suitable for transferring an image to a textile substrate (2), said transfer sheet comprising a base layer and a transfer layer, said transfer layer being present in an amount of 5 to 20 g/m$^2$, preferably in an amount of 8 to 15 g/m$^2$ such as about 12 g/m$^2$. A further aspect of the present invention is a process wherein this transfer sheet is used for transferring an image from a pigment transfer sheet to a textile substrate to provide a textile product carrying said image, said process comprising a transfer step comprising applying a surface pressure of at least 0.4 bar and heat to the superimposed contacted transfer sheet and textile substrate. Yet another
(Continued)

Figure 1:
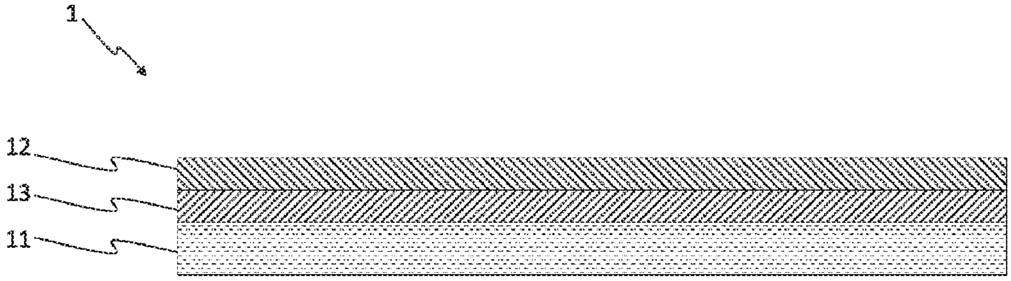

aspect of the invention is a textile product (3) obtainable by the sheet and the process, which textile product has favorable properties like good hand and color fastnesses.

18 Claims, 3 Drawing Sheets

(56) References Cited

U.S. PATENT DOCUMENTS

| | | | | |
|---|---|---|---|---|
| 5,962,149 | A | 10/1999 | Kronzer | |
| 5,981,077 | A | 11/1999 | Taniguchi | |
| 6,033,739 | A | 3/2000 | Kronzer | |
| 6,113,725 | A | 9/2000 | Kronzer | |
| 6,428,878 | B1 | 8/2002 | Kronzer | |
| 6,450,633 | B1 | 9/2002 | Kronzer | |
| 6,601,457 | B2 | 8/2003 | Li et al. | |
| 7,364,636 | B2 | 4/2008 | Kronzer | |
| 9,399,362 | B1 * | 7/2016 | Cobb, III | B41M 5/0355 |
| 2003/0013369 | A1 * | 1/2003 | Soane | D06P 1/228 442/181 |

FOREIGN PATENT DOCUMENTS

| | | | | |
|---|---|---|---|---|
| EP | 0743198 | A1 * | 11/1996 | B44C 1/17 |
| EP | 1102682 | A1 | 5/2001 | |
| EP | 2098634 | A1 | 9/2009 | |
| WO | WO-0173191 | A1 | 10/2001 | |
| WO | WO-2005077663 | A1 | 8/2005 | |

OTHER PUBLICATIONS

"International Application Serial No. PCT/NL2020/050395, Written Opinion dated Sep. 29, 2020", (Sep. 29, 2020), 7 pgs.

Haji Musa, Atiyyah, et al., "Practical considerations of the FTT device for fabric comfort evaluation", Journal Fashion Technology & Textile Engineering, (2018), 1-4.

Rattee, I. D., "Melt-transfer and Film-release Systems of Transfer Printing", Soc. Dyers and Colourists 93, (1977), 190-194.

Harwood, R. J., "The use of the Kawabata Evaluation System for product development and quality control", Journal of the Society of Dyers and Colourists 106.2, (1990), pp. 64-68.

* cited by examiner

PIGMENT TRANSFER PAPER AND PROCESS FOR TRANSFER TO A TEXTILE SUBSTRATE

PRIORITY APPLICATIONS

This application is a U.S. National Stage Filing under 35 U.S.C. § 371 from International Application No. PCT/NL2020/050395, filed on Jun. 19, 2020, and published as WO2020/256549 on Dec. 24, 2020, which claims the benefit of priority to Netherlands Application No. 2023347, filed on Jun. 19, 2019; the benefit of priority of each of which is hereby claimed herein, and which applications and publication are hereby incorporated herein by reference in their entireties.

The invention is in the field of printing images onto textiles. In particular the invention is directed to printing images onto textiles that are based on natural fibers such as cotton, wool or blends of natural and/or manmade fibers.

Traditionally, textiles are provided with images using direct printing such as silk screen printing. In direct printing, as for instance described in EP2098634, a pigment paste is directly applied onto the textile after which the textile must undergo several subsequent steps (i.a. washing and/or curing steps). The requirement of these subsequent steps makes the process undesirably cumbersome. An additional drawback of direct printing via screen printing is the required preparation of the screen, which reduces flexibility and is generally considered only suitable for larger print numbers. In addition, the method is associated with relatively large amount of pigments loses. In a variation of direct printing, also referred to in the art as direct digital printing, pre- and post-treatments steps are required, for which reasons direct digital printing is neither advantageous.

As an alternative to direct printing, indirect printing (also referred to as digital or transfer printing) is developed. For instance, EP1102682 describes sublimation transfer of an image from a sublimation transfer paper to a polyester substrate. Advantageously, digital printing provides maximum flexibility and lower amounts of required ink. However, in practice this method is still limited to printing on synthetic textiles such as polyester textiles or textile with a polyester coating due to poor binding of sublimation dyes to natural fibers.

For textiles based on natural fibers, indirect printing methods have been suggested that are based on transfer sheets as for instance described in WO2005/077663. In such transfer sheets, a paper support layer is provided with a melt transfer layer and an image transfer layer consecutively positioned thereon, as part of several layers coated on the support layer. Printing can be carried out by inkjet-printing an image on the sheet, peeling of the melt transfer layer and the image-receiving layer from the support layer, placing the melt transfer layer and the image receiving layer onto a receiving textile and then applying heat and pressure (for instance with an iron) to melt the transfer layer and adhere the image to the textile. The image receiving layer can comprise self-crosslinkable polymer such as vinylacetate, that can self-crosslink and form a plastic, sealing sheet over the textile, thereby fixating the image to the textile. Although inkjet-printing provides flexibility to a certain degree, there are still many drawbacks to the approaches suggested in the art. The use of many coating layers to the support layer complicates the production procedure of the paper. Less coatings on the support layer is desirable. Furthermore, the requirement to separate the support layer from the melt transfer layer and the image receiving layer before appliance, makes this approach poorly scalable. Indeed, these types of papers are generally only applied on small scale such as in household settings or in small print shops. The required pre-peel hampers printing of larger textile surfaces and the method is therefore generally limited to small surfaces (e.g. A3-paper size or small) and larger surface of textiles cannot be printed with this method. Another major drawback is the formation of the sealing, plastic layer which results in a plastic feel and poor 'hand' of the textile product and relatively poor color fastness to laundering (the plastic layer peels off).

In U.S. Pat. No. 5,981,077, a transfer paper comprising i.a. ethylene-vinyl acetate-acrylate co-polymer (EVA) having a methylol and/or alkoxymethyl group as a self-crosslinkable component is disclosed. A drawback of the paper described in U.S. Pat. No. 5,981,077 is the low-temperature requirement for peeling of the paper support layer after appliance of the transfer paper to the textile substrate. This makes is also less suitable for large scale applications. Another drawback is the thick image transfer layer (e.g. 30 $g/m^2$), which is also believe to a factor resulting the poor hand of the textile product obtainable by this transfer paper.

In U.S. Pat. No. 4,351,871, a paper printing process is described using thermoplastic polymers polyvinyl butyral or polyvinylidene chloride present in the ink itself. Although these papers do not require pre-peeling of a support layer, the self-crosslinkable layer still results in poorer hand than attainable by direct printing. Moreover, the process requires specialty inks that are specifically prepared for the process. Commonly used inks that do not comprise the thermoplastic polymers cannot be used, which limits the applicability of the process. Furthermore, the fact that the thermoplastic polymers are present in the ink makes this ink too viscous for inkjet printing. In U.S. Pat. No. 4,351,871, the image is printed with gravure printing. This further limits the applicability.

In WO 01/73191, a process is disclosed wherein first an image is printed on a silicone paper, after which the layer is covered and bound by a thermoplastic elastomer layer. The image can then be transferred by superimposing the elastomer layer onto a textile substrate and subsequent heating and pressing. This method is associated with several drawbacks. For example, firstly, printing on a silicon paper limits the type of colorants that can be used to toners. Printing with liquid inkjet inks on silicon layers (or other types of release layers) results in extremely poor and unacceptable image qualities. Secondly, the method requires a post-treatment step after printing. This requires further equipment and process steps, making the process undesirably cumbersome.

Yet another conventional paper used in the art for digital printing is Jet-Pro® SoftStretch™, which is commercially available from Neenah, Inc. and described in U.S. Pat. Nos. 5,798,179, 5,962,149, 6,033,739, 6,113,725, 6,428,878 and 6,450,633. A drawback of this paper is the complex production process due to the plurality of coating layers and the unsuitability for large scale application. In addition, the paper results in poorer hand and poorer image qualities with respect to direct printing.

In recent years, no product and process has yet successfully been brought to the market which enable large scale digital printing of textiles that are based on natural fibers such as cotton, and which transfer paper provides the desired final product properties such as good hand, color fastness to rubbing, color fastness to laundering, color fastness to light—even though there is a long-felt need to provide such a transfer paper and digital printing process.

The present inventors however have now surprisingly found an improved paper and an improved process that results in the above-mentioned product properties and which addresses at least part of the drawbacks of the earlier mentioned conventional papers and processes.

The present invention is accordingly directed to a pigment transfer sheet suitable for transferring an image to a textile substrate to provide a textile product carrying said image, said transfer sheet comprising a base layer and a transfer layer, which transfer layer is present in an amount of 5 to 25 $g/m^2$. The present inventors believe that the poor hand of the textile obtainable by the conventional transfer papers can be attributed to the relatively thick transfer sheet or sheets that a present on these papers. The pigment transfer sheet of the present invention has a relatively thin transfer layer that is transferrable to the textile substrate, thereby essentially maintaining the original hand and textile properties of the textile substrate.

The transfer layer has at least two main functions. It can receive the image in an appropriate manner (and as such be considered the image-receiving layer) and it facilitates good transfer of the image to the textile substrate. The composition of the transfer layer is chosen to fulfill at least both of these functions. As such, the transfer layer can be considered an image-receiving layer (or inkjet-receiving layer) having additional functionalities. Some of these functionalities (e.g. fastness properties) are transferred to the textile substrate.

The inventors further surprisingly found that the method with which the image is transferred from the transfer sheet to the textile substrate, and in particular the pressure applied in this method, may significantly influence the properties of the textile product that is obtained. Accordingly, another aspect of the present invention is a method for transferring an image from a pigment transfer sheet to a textile substrate to provide a textile product carrying said image.

Yet another aspect of the present invention is the textile product that can be obtained with the pigment transfer sheet and the method. Said textile product has at least one of the following favorable product properties:

- hand as determined by FTT and as expressed by the Total Active Index and Total Passive Index deviating negatively in total at most 3 points, preferably at most 2 points, more preferably 1 point, most preferably 0 points from the original textile substrate;
- color fastness to rubbing according ISO Test Method 105A03:1993 using a wet rubbing cloth of 3 or more, preferably 4 or more such as 5 and/or a dry rubbing cloth of 3 or more, preferably 4 or more such as 5;
- color fastness to laundering according ISO Test Method 105A2:1993 of 3 or more, preferably 4 or more such as 5;
- color fastness to light according AATCC 16.3:2012, Option 3 of 3 or more, preferably 4 or more such as 5.

In a preferred embodiment of the invention, the transfer sheet is not only composed to provide at least one of said product properties, but it is composed such that said textile product has at least three, more preferably all of the above-listed properties.

In FIG. 1, a preferred embodiment of the pigment transfer sheet in accordance with the present invention is illustrated.

Figure 2:
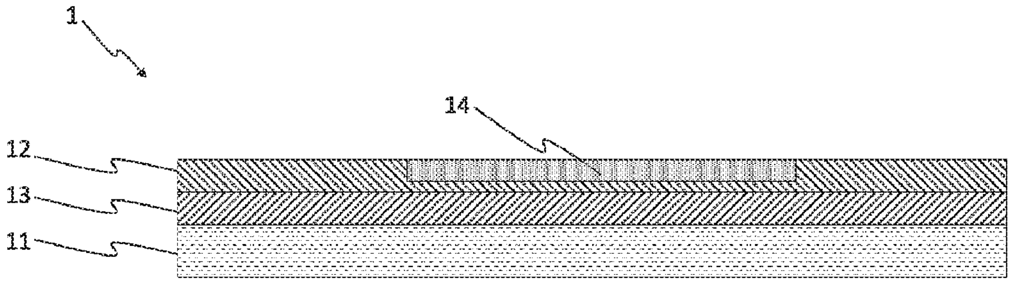

In FIG. 2, a preferred embodiment of the pigment transfer sheet with a printed image thereon is illustrated.

Figure 3:
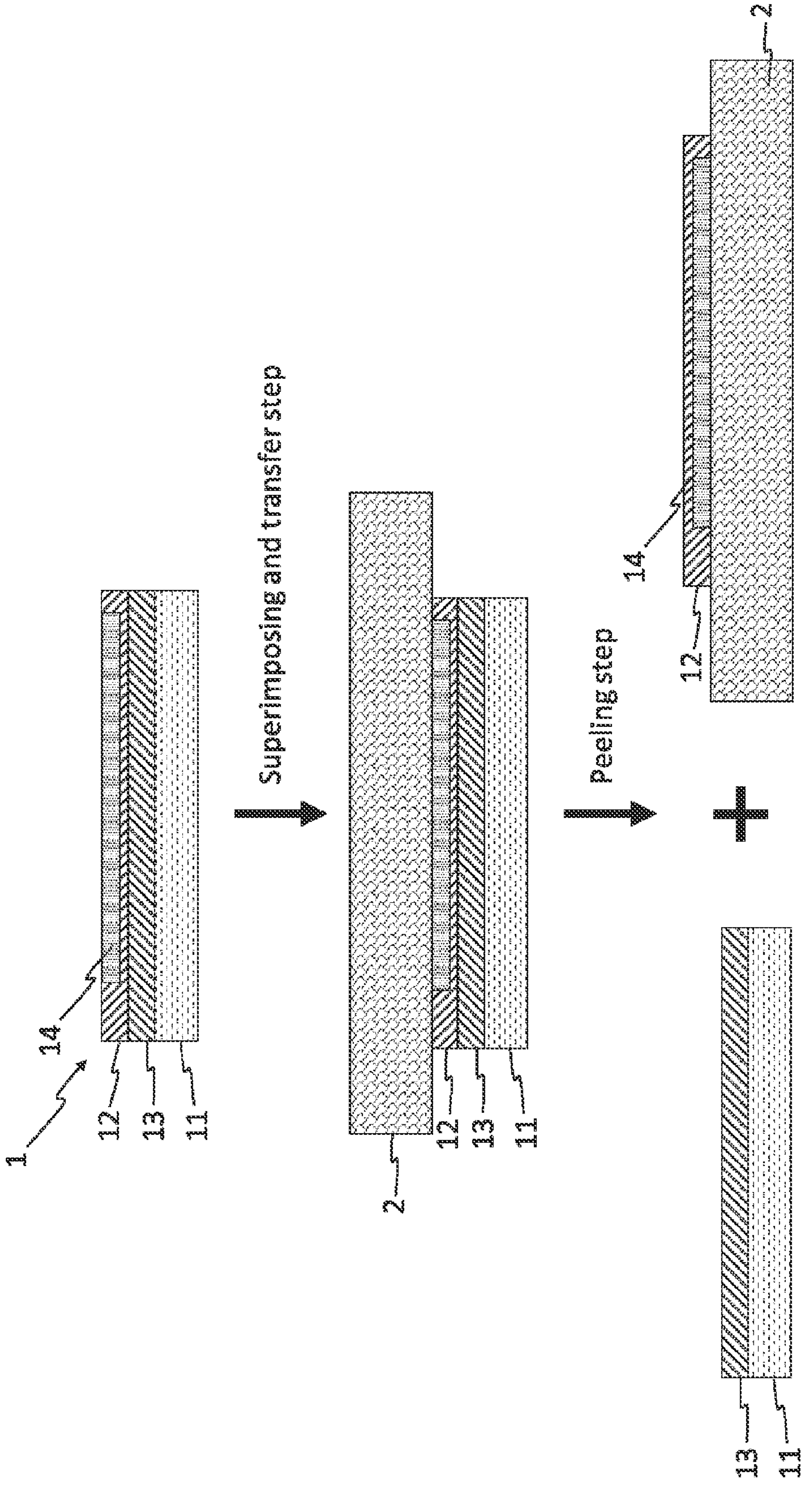

In FIG. 3, a preferred embodiment of a process in accordance with the present invention is illustrated.

Figure 4:
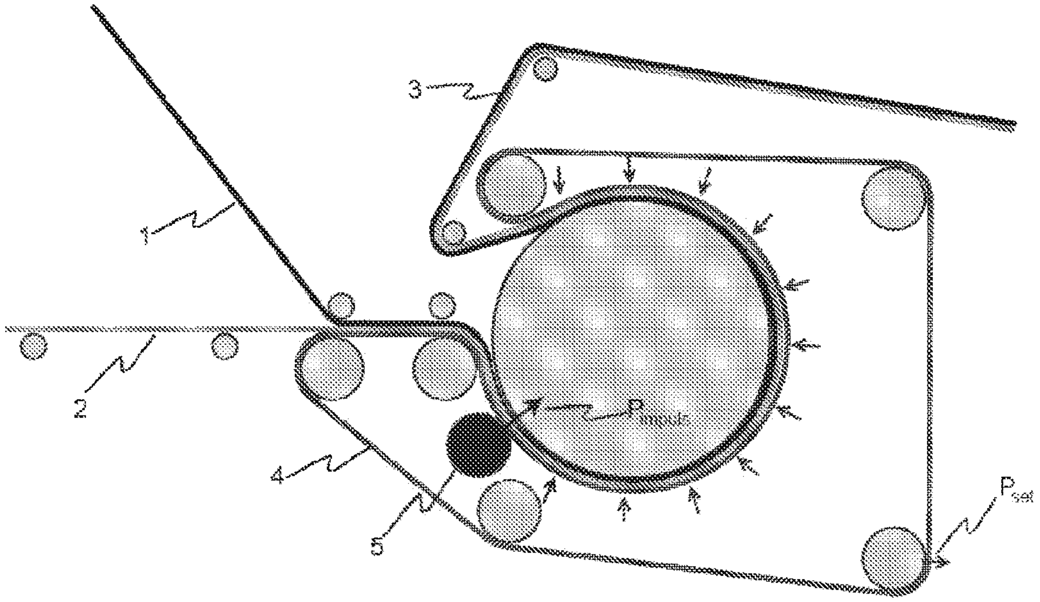

In FIG. 4, a particularly preferred embodiment of the method in accordance with the present inventions is illustrated.

Figure 5:
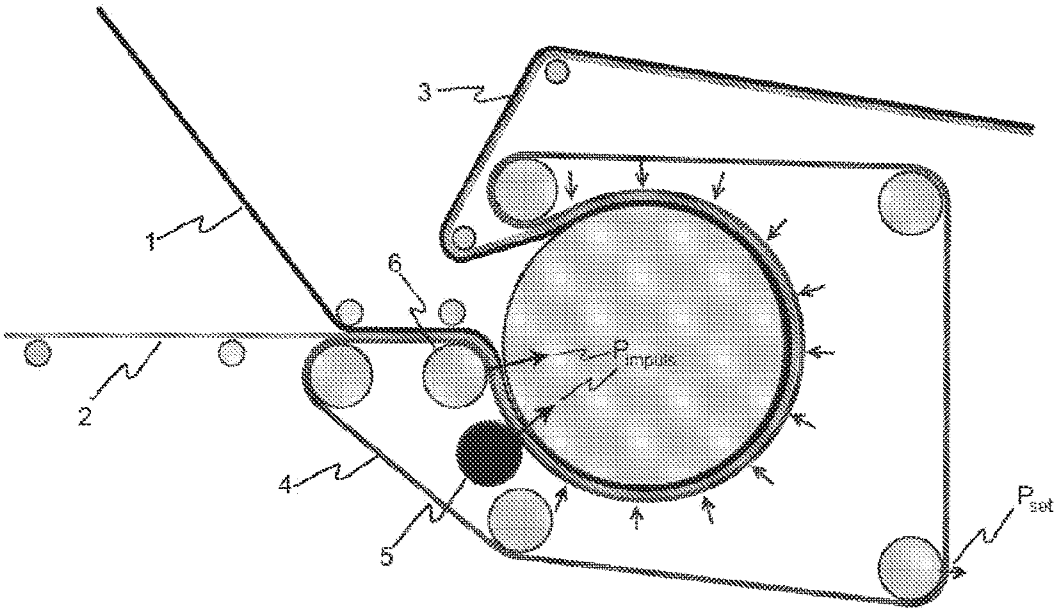

In FIG. 5, another particularly preferred embodiment of the method in accordance with the present inventions is illustrated.

The present inventors surprisingly found that when the composition of the transfer layer comprises textile reactive polymers, this results in particularly good results in terms of textile product properties. The use of these textile reactive polymers allows to maintain a low weight of the transfer layer, which is also believe to contribute to the favorable textile product properties.

When used in a digital printing processes on textile substrates based on natural fibers, a textile product (i.e. a textile comprising an image resulting from the digital printing process) can be obtained that has very favorable textile properties such a hand. Hand, or hand feel, is a term known in the art and refers to the tactile qualities or characteristics of a fabric perceived by touch, such as softness, warmth, stiffness, and smoothness. A textile having a soft of good hand may be characterized as being highly elastic, relatively smooth and soft, as opposed to a textile having a harsh or poor hand, wherein the fabric is notably stiffer and rougher.

The textile product of the present invention preferably has a better hand compared to comparative product obtainable by conventional digital printing techniques such as those described herein above and disclosed in e.g. WO2005/077663. The product of the present invention feels softer, smoother and less stiff. The skilled person is capable of distinguishing this.

Analytic methods for determining hand also exist in the art. One of these methods in the Kawabata Evaluation System (KES, see also Harwood et al. *Journal of the Society of Dyers and Colourists* 106 (2008) 64-68). Alternatively, the hand can be tested in a Fabric Touch Tester (FTT™ M293) as described in U.S. Pat. No. 6,601,457 and commercially available from SDL Atlas LLC, USA, and carried out as described in Binti Haji Musa et al. (2018) Practical Considerations of the FTT Device for Fabric Comfort Evaluation *Journal of Fashion Technology & Textile Engineering S*4:003 (herein abbreviated as determined by FTT). The hand can also be determined by touch perception of a test panel of one or more experts.

The hand or touch as determined by FTT can be expressed by various parameters, as detailed in Binti Haji Musa et al. (2018) Practical Considerations of the FTT Device for Fabric Comfort Evaluation *Journal of Fashion Technology & Textile Engineering* S4:003 (which is incorporated herein in its entirety). The hand indices obtainable by this method refer to the untreated (unprinted) side of the fabric (passive, wearing the fabric), while the touch indices refer to the treated (printed) side of the fabric (active, touching the fabric). The touch and hand indices obtainable by the FTT are so called Global Comfort Indices (GCI), ranging from 0.0 to 1.0. The GCI's is based on the comfort indices such as smoothness, softness and warmth, of which a total passive index and total active index can be derived, ranging from 1.0 to 5.0 after grading. The passive indices refer to the feel when wearing the fabric inside of the sample (untreated side/not coated side), while the active indices refer to the touch with fingers on the outside of the face (treated side/coated side). The Global Comfort Indices and the passive and active indices of the textile product i.a. depend on the indices of the original textile substrate. A sturdy, stiff textile substrate will result in a sturdier and stiffer textile product than a flexible, pliable textile substrate. As such, the Global Comfort Indices and the passive and active indices are related to the original, or untreated textile substrate and is herein expressed as such. If the Total Indices are all the same for the textile product and the original textile substrate, the hand of the textile product, as determined by FTT and as expressed by the Total Active Indices and Total Passive Indices deviate 0 points from the original textile substrate. The less the Total Comfort Indices of the textile product negatively deviate from the original textile substrate, the less image transfer negatively influences then hand of the textile, which is preferred. Preferably, the hand as determined by FTT and as expressed by the Total Active Indices and Total Passive Indices deviate negatively in total at most 3 points, preferably at most 2 points, more preferably 1 point, most preferably 0 points from the original textile substrate. The Total Indices herein range from 1.0 to 5.0, as detailed above.

Other parameters that indicate favorable product properties include—color fastness to rubbing, color fastness to laundering, and color fastness to light.

Color fastness to rubbing is a measurement of the amount of color transferred from the surface of colored textile material to other surfaces by rubbing and can be determined according to ISO Test Method 105-A03:1993. Unless specifically indicated otherwise, all references to color fastness to rubbing measurements described herein are carried out according to this ISO method. Further, for the sake of completeness, it is noted that all textile product properties referred to herein, are to be determined at a part of the textile product that is actually covered by the transferred image. Preferably, the textile product of the present invention has a color fastness to rubbing according to this test method using a wet rubbing cloth of 3 or more, preferably 4 or more such as 5 and/or a dry rubbing cloth of 3 or more, preferably 4 or more such as 5.

Color fastness to laundering is a measurement of i.a. the color characteristics and can be determined by ISO Test Method 105A2:1993. Unless specifically indicated otherwise, all references to color fastness to laundering measurements described herein are carried out according to this ISO method. Preferably, the textile product of the present invention has a color fastness to laundering according to this test method of 3 or more, preferably 4 or more such as 5.

Color fastness to light is a measurement of the effect on the color of textiles of all kinds and in all forms to the action of an artificial light source representative of natural daylight and can be determined according AATCC 16.3:2012, Option 3. Unless specifically indicated otherwise, all references to color fastness to light measurements described herein are carried out according to this AATCC method. Preferably, the textile product of the present invention has a color fastness to light according to this test of 3 or more, preferably 4 or more such as 5.

The above-mentioned textile product parameters are signs that the product is of good quality, in contrast to the plastic, poor hand products available through conventional digital image printing. As such, the textile product according to the present invention have the same quality or better as textiles obtained by direct printing, but can advantageously be prepared with more flexibility, less cumbersome process, less costs, and less ink losses. It may be appreciated that the textile product according to the present invention can be distinguished from products obtained by direct printing by the use of pigments, the presence of the image transfer layer and the like. Also, the penetration of the pigments is less with the present invention compared to direct printing. A skilled person is able to differentiate both type of products.

Without wishing to be bound by theory, the present inventors believe that the favorable textile product properties can at least partially be attributed to the transfer sheet. Another factor that may contribute to the favorable product properties is the process for the preparation of the textile product, which is further detailed herein-below. The transfer layer of the pigment transfer sheet preferably comprises textile reactive polymers. It is believed that upon application, these reactive polymers bind to the textile substrate, resulting in good, local adhesion or gluing of the polymers to the textile, without requiring a full adhesive plastic sheet that seals the pigments, in contrast to the conventional papers. The reactivity of the polymers is also believed to result in the good color fastness to rubbing and laundering obtainable by the pigment transfer sheet.

Chemically, natural fibers typically differ from polyester fibers for the present of hydroxyl-groups, amino-groups and the like. Unlike polyester fibers, natural fibers comprise polysaccharides and/or protein constituents such as cellulose, hemicellulose, keratin and the like. These constituents are believed to be capable of reacting with the reactive polymers. Examples of natural fibers on which the textile can at least partially be based include cotton, viscose, silk, coir, flax, hemp, jute, ramie, sisal, mohair, cashmere, camel hair and wool. In a preferred embodiment, the textile reactive polymers are at least reactive with cotton. However, the effective application of the pigment transfer sheet is not necessarily restricted to any of the above-mentioned natural fiber-based textiles and the sheet may also suitably be used for synthetic textiles such as nylon-based, spandex and/or elastane-based textiles or blends.

The textile reactive polymers preferably comprise cross-linkable polymers, more preferably self-cross-linkable polymers. As such, the polymers are capable of forming a network or matrix that can be bound to the natural fibers. Examples of cross-linkable polymers include polyethylene amines, isocyanates, carbodiimides and ammonium zirconium carbonates. In a preferred embodiment, the textile reactive polymers comprise isocyanates, carbodiimides and ammonium zirconium carbonates, most preferably isocyanate groups. These carbodiimides and ammonium zirconium carbonates and isocyanate polymers can suitably react with natural fibers (e.g. with the hydroxyl-groups of the cellulose of cotton) and form cross-linking bonds to form the polymer network. The cross-linking bonds can be formed with functionalities found in the textile reactive polymer itself (such that the polymer is self-cross-linkable) or with functionalities found in other polymers present in the transfer layer, such as poly-urethane or polyacrylic polymers.

The isocyanate groups for the textile reactive polymers can be differentiated into blocked and unblocked isocyanate groups. Unblocked isocyanate groups directly comprise the isocyanate (i.e. chemical R—N═C═O functionality), while blocked isocyanates are generally formed by a blocking agent (e.g. an alcohol or methylene compounds such as malonic esters). The blocked isocyanates can be unblocked by heating for example. The advantage of blocked isocyanates can be a reduced reactivity and prolonged stability when the paper is stored. The advantage of unblocked isocyanates can be an improved rate in the cross-linking reactions and therefore improved transfer yields. In general, the use of unblocked isocyanates is overall preferred.

Surprisingly, the cross-linkable polymers not only result in good fastness properties and the hand, but also in good print quality. Print quality can be regarded as a summary of qualities such as color density, color intensity, color saturation and the evenness or homogeneousness of these qualities. The skilled person is generally capable of assessing the print quality by sight.

Beside the textile-reactive polymers, the transfer layer preferably further comprises one or more of the group consisting of a binders, rheology modifiers, pigments, defoamers or deaerators, wetting agents and combinations thereof. Typically, the rheology modifiers are used to adjust the rheology needed for coating, deaerators or defoamers to remove excess of foam during coating preparation and the wetting agent for improvement of the print quality. Best results were obtained when the transfer layer comprises one or more binders, one or more crosslinking agents, one or more pigments, one or more wetting agents. Results typically deteriorate when one of these additives is left out.

Typical rheology modifiers include polyacrylates, carboxymethylcellulose (CMC) and polyurethanes. It was found that the presence of this compound can result in a better hand when compared to similar compositions not comprising rheology modifiers.

The function of the binder is to bind the components of the composition in the transfer layer. Examples of suitable binders include poly(vinyl alcohol) (PVO), polyacrylates, polyurethanes, polyethylene, polystyrene, starch and carboxymethylcellulose (CMC). Surprisingly, it was found that the best results in terms of print, drying time, fastness properties are obtainable by applying at least two binders. Thus, the binder not only serves to bind the components in the layer when the layer resides on the pigment transfer sheet, it also facilitates obtaining good transfer results. In particular, a combination of polyurethane and acrylate, in particular polyurethane and styrene acrylate gave excellent results when used together in the transfer layer.

The pigments that can be present in the transfer layer functioning to provide the layer with a neutral or white color such that the coloring by the printing process is not negatively affected. Typical pigments that can be present include calcium carbonate, calcium stearate, silica and nylon. It was surprisingly found that certain pigments, including calcium carbonate, calcium stearate, silica and nylon can also advantageously prevent blocking of the paper and therefore be suitably employed as anti-blocking agents. Accordingly, the transfer layer preferably comprises anti-blocking agents such as calcium carbonate, calcium stearate, silica and nylon.

Defoamers or deaerators are typically surfactants that reduce and hinder the formation of foam by destabilizing foam lamellas. Ethoxylates and siloxanes are suitable defoamers for the present invention. Defoamers and rheology modifiers function to stabilize the coating recipe and therewith contribute to the overall printing quality.

Wetting agents lower the surface tension and increase the spreading properties and lead to better print quality. Suitable wetting agents can include ethoxylates and copolymers thereof, alcylamine polyglycol and the like. It was surprisingly found that the wetting agent not only contribute to the print quality, but also to good fastness properties.

The base layer is preferably a base paper layer that is typically cellulose based. The typical open structure of the substrate such as paper contributes positively to the drying time of printed substrate, which is particularly important for water-based inks. For this reason, a base paper layer is preferred over polymer film layers. In order to enable good release of the transfer layer after transfer the paper is preferably adapted to prevent or at least limit undesired adhesion of the base layer such that it tears or is glued to the textile substrate after the transfer step. To this end, the pigment transfer sheet of the invention preferably comprises a release layer that is positioned between the base layer and the transfer layer. The release layer is therefore optional, but preferred. In a most preferred embodiment, the pigment transfer paper (1) of the present invention comprises three layers: said paper base layer (11), said release layer (13) and said transfer layer (12), as illustrated in FIG. 1. Less layers are preferred for an easier production of the sheet, since less coatings steps would be required. As such, the sheet of the invention preferably comprises three or less layers.

The release layer generally comprises a meltable composition, preferably comprising one or more silicones, acrylates and/or waxes, preferably waxes, more preferably polyolefin waxes such as polypropylene and/or polyethylene waxes. The waxes are particularly suitable for preventing or at least limiting undesired adhesion of the base layer to the textile substrate and allows good peel after the transfer step. The presence of the meltable composition results in the pigment transfer sheet being usable as a so-called hot-peel sheet, meaning that after the transfer step, the base layer is separable from the textile product at an elevated temperature (vide infra). Alternatively, the release layer can be tailored such that the transfer sheet is usable as a cold-peel sheet, meaning that the base layer is separable from the textile product at room temperature. Tailoring of the release layer to provide a cold-peel sheet may i.a. include matching the surface tensions of the release layer and the transfer layer.

The release layer may further comprise polymers such as poly(ethylene-acrylic acid), silicones such as polydimethylsiloxans, rheology modifiers such as polyacrylics, polyurethanes, carboxymethylcellulose (CMC) and/or surfactants such as siloxanes and ethoxylates. Other additives that may be included in the release layer are binders such as PVO and starch, and pigments such as calcium carbonate and clay.

The base layer is preferably a base paper layer that can be based on a general base paper, having a weight in the range of 50 to 120 g/m$^2$, preferably 80 to 110 g/m$^2$ such as about 90 g/m$^2$ and having a caliper of 50 to 120 μm, preferably 80 to 110 μm, more preferably about 90 μm. The base paper layer typically comprises soft and/or hard wood fibers and additionally one or more fillers, sizing agents, wet strength and dry strength agents, retention aids and starch.

The release layer is preferably present to lead to a high transfer yield. In this respect, a low amount of release layer may not lead to such a high transfer yield and accordingly there is typically a minimal amount of the release layer present (e.g. 1 g/m$^2$). However, it was found that there is typically also a maximum amount of the release layer present to minimize the deterioration of the hand, which was found to possibly occur for certain amounts of release layer. Accordingly, if the release layer is present, which is preferred, this layer is typically coated onto the base paper in an amount of 1 to 10 g/m$^2$, preferably 3 to 7 g/m$^2$, most preferably about 4 or 5 g/m$^2$.

The transfer layer can be coated onto the release layer (if present) or directly onto the base paper (if the release layer is absent). If other layers are present, the transfer layer is typically the last layer to be coated, as this layer is facing the textile sheet onto which the image is transferred. Coating the transfer layer on its preceding layer generally results in the transfer layer essentially fully and uniformly covering the side of the layer on which transfer layer is coated. When the amount of transfer layer is too low (e.g. less than 5 g/m$^2$), the transfer yield is typically unsatisfactory. On the other hand, when the amount of transfer layer is too high (e.g. more than 20 g/m$^2$), the hand is typically unsatisfactory. The amount of transfer layer is thus a balance between maintaining sufficient transfer yield, without scarifying a good hand. Accordingly, the transfer layer is typically coated in an amount of 5 to 20 g/m$^2$, preferably in an amount of 8 to 15 g/m$^2$ such as about 12 g/m$^2$.

Unless specifically indicated otherwise, the amounts and weights of the various layers specified herein refer to dry weight. The determination of dry weight after the respective layer has been applied onto the underlying layer can be carried out using conventional methods known to the skilled person and typically include drying the transfer sheet at a temperature of about 105° C.

Without wishing to be bound by theory, it is believed that maintaining a relatively low weight of the transfer layer is facilitated by the use of the textile reactive polymers. By using these polymers, a lower amount of polymer is believed to be required when compared to other cross-linkable polymers. This lower amount is believed to provide the reduced 'plastic feel' or better hand. In addition, it is believed that maintaining a low weight is facilitated by applying sufficient pressure in the method for transferring the image from the pigment transfer sheet to a textile substrate.

More specifically, in accordance with the present invention, the textile product is preferably obtained by transferring the image from the pigment transfer sheet to a textile substrate in a transfer step wherein both pressure and heat are applied. A typical process according to the invention comprises:

- providing a pigment transfer sheet comprising a base layer and a transfer layer with a printed image of pigments on the transfer layer;
- superimposing the pigment transfer sheet and the textile substrate by contacting the transfer layer with the textile substrate
- applying pressure and heat to the superimposed contacted transfer sheet and textile substrate; and
- separating the base layer from the textile substrate and at least part of the transfer layer;

wherein applying said pressure in the transfer step comprises applying a surface pressure of at least 0.40 bar.

As explained herein-above, it is believed that the favorable textile product properties can at least partially be attributed to the pigments transfer sheet. It was found that in addition, certain transfer process parameters can also very favorably influence the textile product properties.

In FIG. 2, an embodiment of the pigment transfer sheet (1) comprising the base layer (11), the transfer layer (12) with a printed image (14) of pigments on the transfer layer is illustrated. The optionally present release layer (13) is also present.

In FIG. 3, an embodiment of the present in accordance with the present invention is illustrated. The pigment transfer sheet (1) with an image as illustrated in FIG. 2 is depicted which is superimposed on a textile substrate (2) in the superimposing step. Then, in the peeling step following the transfer step, the textile substrate with the transfer layer and the image are peeled of the base layer resulting in the textile comprising the image.

Typically, the step of applying pressure and heat (herein also referred to as the transfer step) is carried by heating the superimposed contacted transfer sheet and textile substrate are heated to a temperature in the range of 100 to 250° C. The temperature should be sufficient to induce transfer, but should also not be too high to cause burning or deterioration of the textile substrate. As such, the temperature is preferably kept below 200° C., more preferably in the range of 150 to 200° C., most preferably in the range of 170 to 195° C. such as about 190° C.

It was found that the pressure applied during the transfer step has a large effect on the degree and quality of the transfer step. Good results are obtained by pressing the superimposed contacted transfer sheet and textile substrate with a sufficiently high surface pressure, i.e. a surface pressure of more than 0.40 bar. With surface pressure is meant the amount of pressure that is applied to the surfaces of the superimposed pigment transfer sheet and the textile substrate. As is further detailed herein-below, in the field is often referred to the set pressure (i.e. the pressure setting indicated by the apparatus providing the pressure). However, the set pressure typically does not equal the surface pressure, requiring conversion of the set pressure to the surface pressure or vice versa.

In general, a pressure that is higher than the pressure that is typically applied by hand using an iron may be sufficient. A maximum pressure that is typically achievable by hand using an iron is about 0.1 bar (corresponding to a force of 17 kg at a surface area of 180 $cm^2$). Preferably, the present surface pressure is more than 0.50 bar and/or up to 2 bar, for instance in the range of 0.60 bar to 1 bar. It was observed that in some cases even at a low pressure, full transfer of the image was obtained (thus the degree of transfer being very good). However, in these cases the quality of the transfer was relatively poor as the textile product showed a low color fastness to rubbing, low color fastness to laundering or both. As such, a higher pressure provides better results. Nonetheless, at a surface pressure of about 0.1 bar, transfer yield is none to very poor, even for a duration of up to 120 seconds. Without wishing to be bound by theory, the inventors believe that sufficient pressure is required to sufficiently penetrate the textile fibers with the transfer layer and the pigments, and thus also with the preferably present textile reactive polymers such that the polymers can sufficiently react and bind to the textile fibers.

The pressure during the transfer step can be delivered with various means. A conventional approach to deliver the pressure is by using a heat press. The amount of pressure that is set in the heat press is however not to be confused with the surface pressure that actually exerted onto the superimposed transfer sheet and the textile substrate. For instance, depending on the heat press, a pressure may be set in the range of 1 to 100 bar, but this pressure generally concerns the pressure that is exerted onto a cylinder that is driving the pressure plates. Since these pressure plates have a much larger surface that the cross-section of the cylinder, the set pressure does not equal the surface pressure (i.e. the pressure exerted onto the superimposed sheet and substrate by the pressure plates). Accordingly, the set pressure can be converted into the surface pressure using the respective surface areas. The surface pressure can also be determined by using analytical techniques such as pressure papers or pressure sensors.

A particular advantage of the pigment transfer sheet and the process according to the present invention, is that the transfer step (i.e. applying pressure and heat to the superimposed contacted transfer sheet and textile substrate) can be carried out using calendering. In fact, the inventors found calendering conditions which result in excellent transfer results in terms of degree and quality. Calendering enables continuous processing, processing of textile substrates having large surface areas and good control over the process parameters. As such, calendering is ideally suited for large scale processes.

In the calendering of the present process, any type of calender can be used as long as it can provide the desired transfer step conditions (e.g. sufficient temperature, pressure and dwell time). Preferred calenders are for instance a lamination calender and a regular transfer calender. Regular transfer calenders are conventionally used for sublimation transfer, while lamination calender (also referred to as coating calender or laminating and coating calender) are conventionally used to laminate or coat textiles such as non-wovens. Such calenders are for instance commercially available from Klieverik Heli BV, the Netherlands and Monti Antonio S.p.A., Italy. For the present invention, the lamination calender is particularly preferred as it can readily provide sufficient pressure to obtain good transfer results by equipping the calender with lamination cylinders. However, a regular transfer calender adjusted to provide sufficient pressure is also highly preferred, since this would alleviate the requirement of providing two types of calenders for sublimation transfer and transfer according to the present invention.

When calendering is used in the process according to the present invention, the pressure applied during the transfer step can be expressed by the set pressure (vide infra), which is a pressure that is indicated by the calender apparatus. The set pressure however, typically does not directly equal the amount of pressure that is actually exerted onto the transfer sheet and the textile substrate (herein referred to as the surface pressure). In the field, calender pressures during sublimation transfer are for instance typically set in the range of 2 to 10 bar, but the pressure exerted directly to the paper sheet and textile substrate inter alia depends on the size of the cylinders used and therefore generally does not equal the set pressure but is generally much lower. However, taking into account the contact surface area, the set pressure can be converted into the surface pressure. Besides influencing the set pressure, the surface pressure during the transfer step can also be increased by providing a web sheet, that is fed through the calender together with the superimposed pigment transfer sheet and the textile substrate. The web sheet has a thickness which results in an increased pressure on the superimposed pigment transfer sheet and the textile substrate and improved results in terms of transfer degree and quality.

Although the surface pressure plays a role in the transfer results, it was found that even better results can be obtained with a pressure impulse, for instance provided by lamination cylinders. In particular, the inventors surprisingly found that good transfer results can be obtained when the transfer step comprises the pressure impulse introduced at the beginning of the transfer step. With pressure impulse is meant a temporary increase in pressure compared to the surface pressure provided during at least part of the transfer step in the dwell time window (i.e. the time during which the superimposed contacted transfer sheet and textile substrate are heated and pressed to achieve sufficient transfer). Preferably, the pressure impulse is provided within the first half of the dwell time, more preferably within the first quarter of the dwell time. The pressure impulse can be provided by means of the calender adapted to provide said pressure impulse, for instance by the aforementioned lamination cylinders. Additionally or alternately to the pressure impulse provided by a lamination cylinder, the pressure impulse can also be provided by a feeding cylinder in the art sometimes also referred to a feed roller.

In preferred embodiment, the pressure impulse is a pressure of at least 2 bar applied to the surface of the superimposed transfer sheet and the textile substrate. The pressure impulse is preferably at least 4 bar, more preferably at least 6 bar applied to the surface of the superimposed transfer sheet and the textile substrate. It was found that the pressure impulse of these values can compensate for a lower surface pressure that is exerted during the remaining time of applying heat and pressure (i.e. dwell time). It was found that in the embodiments wherein a pressure impulse is applied, the complementing surface pressure that is applied during the dwell time can even be lower than 0.40 bar. As such, it is possible that a conventional calender, e.g. a regular transfer calenders that is not capable of providing a constant surface pressure of 0.40 bar or higher, can nevertheless be used by equipping this calender with a cylinder adapted for providing the pressure impulse.

The surface pressure that is applied during the transfer step can accordingly be differentiated in various types of pressures applied. A part of the surface pressure applied can be considered a base surface pressure, which is a minimum surface pressure that is applied during essentially the entire dwell time. In case a heat press or a regular transfer calender is applied, the base surface pressure is essentially all the pressure that is applied during the dwell time. Another part of the surface pressure may be the impulse surface pressure, which is a temporary applied surface pressure that is higher than the base pressure. According to the present invention, the surface pressure that is applied during at least part of the transfer step is more than 0.40 bar, preferably more than 0.50 bar. This surface pressure can be the base surface pressure, the surface pressure impulse, or a combination of both. Thus, the surface pressure can be provided by a (batch-wise) heat press, the calender cylinders, the lamination cylinders delivering the pressure impulse, and/or the felt in regular transfer calenders. However, as described herein-above, providing this pressure including a pressure impulse is preferred.

In the embodiments wherein applying the surface pressure does not comprise applying the pressure impulse (e.g. in a regular batch-wise, heat press), the surface pressure comprises a base surface pressure of more than 0.40 bar, preferably more than 0.50 bar and may be up to about 2 bar, for instance in the range of 0.60 bar to 1 bar. Although this base surface pressure may be complemented with the pressure impulse, it is typically not required.

In the embodiments wherein applying the surface pressure does comprise applying the pressure impulse (e.g. in a transfer calender equipped with one or more lamination cylinders), the surface pressure comprises a base surface that may be less than 0.40 bar (albeit higher than zero bar). The pressure impulse is than preferably more than 2 bar, as defined and detailed above.

In FIGS. 4 and 5, particular embodiments of the invention comprising calendering with a pressure impulse is illustrated. An incoming pigment transfer sheet (1) and a textile substrate (2) are superimposed and jointly fed to the calender, which calender comprises a felt (4) capable of providing the set pressure ($P_{set}$) in the transfer step. The calender further comprises a lamination cylinder (5) that is adapted to provide the superimposed transfer sheet (1) and the substrate (2) a pressure impulse ($P_{impulse}$). As specifically illustrated in FIG. 5, Additionally or alternately to the pressure impulse ($P_{impulse}$) provided by the lamination cylinder (5), the pressure impulse can also be provided by the feeding cylinder (6) (in the art sometimes also referred to a feed roller). Exiting from the calendar is the textile (3) to which at least the base layer is still adhered. In a next peeling step, this base layer can be separated from the textile to provide the textile product (not shown).

Without wishing to be bound by theory, the inventors believe that the pressure impulse enables good penetration of the transfer layer (in particular of the textile reactive polymers, if present) and the pigments into the textile fibers, such that the polymers can sufficiently react with and/or adhere to the fibers. This theory is supported by an observation that the pressure impulse leads to a higher transfer quality than a comparable process (carried out at the same temperature) without pressure impulse, even though both processes showed a comparable transfer degree. As such, it is believed that even if the textile reactive polymers are transferred and are allowed to cross-link (the temperature and the pressure outside the pressure impulse were the same for both processes), the polymers can form a kind of polymer sheet on the textile substrate resulting in a transfer that is essentially full (in terms of degree) but of low quality because of poor color fastness to rubbing. Moreover, the inventors observed that a good transfer degree can be obtained by providing the pressure impulse at either the beginning or at the end of the transfer step, but that providing the pressure impulse at the beginning of the transfer step results in a better transfer quality, at least in terms of color fastness to rubbing.

Yet another parameter that is found to influence the degree (also referred to as transfer yield, or yield) and quality of the transfer step is the time during which the superimposed contacted transfer sheet and textile substrate are heated and pressed (herein also referred to as dwell time). The dwell time should be sufficient to allow good transfer (both in terms of degree as in quality), but is ideally not too high as to hamper the overall process speed. A low process time is particularly preferred in high scale production, for which the present invention is particularly suitable. Higher process speeds increase production efficiency and reduce production cost per production line. Accordingly, the dwell time in the present process is preferably in the range of 10 to 90 seconds, more preferably 15 to 60 seconds, most preferably 25 to 50 seconds such as about 45 seconds.

In the embodiments comprising the pressure impulse, the dwell time is to be understood as the entire time during which a pressure is exerted onto the superimposed transfer sheet and the textile substrate to achieved sufficient transfer. The time of the pressure impulse is typically much shorter, e.g. a couple of second such as about 0.5 to 5 seconds. If the surface pressure exerted during the pressure impulse is sufficiently high, such a short time is sufficient, in particular in combination with the pressure exerted during the remaining dwell time.

The peeling step is preferably carried out within seconds, e.g. within 20 second, more preferably within 10 seconds. Formulated differently, the base layer is preferably separated from the textile substrate at an elevated temperature, most preferably at a temperature of more than 50° C., most preferably at a temperature of more than 100° C. As such, the peeling step is preferably a hot-peeling step. Hot peeling is particularly advantageous for continuous processes and for use with the calendering as it enables a fast throughput of the textile substrate and pigments transfer sheet. A cold-peel step would require intermediate cooling of the superimposed sheet and substrate after the transfer step, which would either require a long time period or active cooling. Neither is preferred.

With the peeling step, the base layer is separated from the textile substrate and at least part of the transfer layer. When the transfer efficiency is maximum, all intended parts of the transfer layer and the image printed thereon are transferred to the textile substrate. In particular embodiments, the transfer layer is entirely transferred to the textile substrate to the extend the layer and substrate were transposed and exposed to the heat and pressure in the transfer step. In certain preferred embodiments, the transfer layer may be transferred only to the extend it is carrying an image. In other words, in these preferred embodiments, the parts of the transfer layer that do not carry the image (e.g. white and/or colorless parts of the image) may advantageously not be transferred to the textile substrate.

The release layer (if present) may split upon peeling and a part thereof can accordingly be transferred to the textile substrate as well. The release layer (if present) may also remain intact, in which case it will remain with the base layer after the peeling step.

In a preferred embodiment, the process further comprises a stretching step of the textile substrate after the peeling step. In this step, the textile substrate comprising the image is stretched. It was surprisingly found that this improves the hand, without negatively affecting color fastness to rubbing and/or any other of the favorable textile properties. The stretching step can easily be carried out in a continuous fashion, for instance after the calendering, e.g. by providing suitable rollers (e.g. of different size or at different rotation speeds).

The image of pigments can be printed on the pigments transfer sheet by various methods. The invention is not limited to a specific printing method, although a preferred method may comprise inkjet printing. The invention is further not limited to a specific type of pigment or ink, as the binding to the textile can be carried out by the transfer layer, and not by the pigment or ink itself. However, the use of self-binding and/or reactive pigments is not excluded and may in some embodiments even be preferred, in particular if a long-lasting and/or highly-durable textile product is desired. A combination of binding by both the transfer layer and the ink itself, may provide extra-ordinary durability. Accordingly, a sublimation dye may also be used in particular embodiments, especially when such sublimation dye binds particularly well to the textile substrate by themselves. Other inks that may suitably be used include latex inks and UV-curable inks (see for example Stephen Hoath, Fundamentals of Inkjet Printing, Wiley-VCH 2016). General inkjet inks, latex inks, UV-curable inks and sublimation inks are all printable with inkjet printing. These inks are therefore preferred over inks or colorants that cannot be printed with inkjet printing.

The present invention is particularly suitable for printing on natural-fiber-based textiles and blends, because other methods such as sublimation dye transfer are not suitable for transfer to such textiles. Examples of natural-fiber-based textile substrates for which the present invention is particularly suitable include those selected from the group consisting of cotton, viscose, silk, coir, flax, hemp, jute, ramie, sisal, mohair, cashmere, camel hair and wool, or combinations thereof. In a preferred embodiment, the textile substrate for the present invention comprises cotton or viscose, most preferably cotton. It was found however, that the present invention is also suitable be non-natural-textiles such a nylon and/or elastane textile. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features.

For the purpose of clarity and a concise description features are described herein as part of the same or separate embodiments, however, it will be appreciated that the scope of the invention may include embodiments having combinations of all or some of the features described.

The present invention can be illustrated using the following non-limiting examples.

Example 1—Preparation of Pigment Transfer Sheet and Pigment Transfer on a Cotton Substrate Using a Heat Press Pigment transfer sheets (papers) A-H were prepared by coating a base paper layer of 90 g/m$^2$ with a release layer (about 8 g/m$^2$) and coating the release layer with a transfer layer (about 16 g/cm$^2$) using different compositions, as detailed in Table 1.

Next, an image was printed with an inkjet printer on the pigment transfer sheet and the image was transferred on a cotton substrate in a heat press set at 190° C. and 4 bar, corresponding to 0.65 bar surface pressure, for a duration of about 30 seconds, followed by peeling the base paper of the textile to provide a textile product.

The pigment transfer sheet, obtained textile product and the transfer process were assessed for the following properties:

- adhesion paper-coating
- drying time after printing
- print quality
- peel process
- transfer yield
- hand as determined by expert touch
- color fastness to wet rubbing according ISO Test Method 105-A03:1993
- color fastness to dry rubbing
- color fastness to laundering The results are provided at the bottom in Table 1.

TABLE 1

| Paper: | A | B | C | D | E | F | G | H |
|---|---|---|---|---|---|---|---|---|
| Binder | | | | | | | | |
| Polyurethane | x | x | x | | x | x | x | x |
| Polyacrylate | | | | | | | | |
| Styrene acrylate | x | x | | x | x | x | x | x |
| Pigment | | | | | | | | |
| Silicon dioxide | | | | | x | | | |
| Copolyamide | x | | | | | | | |
| Silicon dioxide | | x | | | | | | |
| Calcium stearate | | | | | | | | |
| Cross-linking agent | | | | | | | | |
| Isocyanate | x | x | x | x | x | | x | x |
| Ammonium circonium carbonate | | | | | | x | | |
| Defoamer | | | | | | | | |
| Silicone based agents | | x | x | x | | | x | x |
| Silicone free emulsion | | | | | | | | |
| Rheology modifier | | | | | | | | |
| Polyurethane | | x | x | x | x | x | x | x |
| Carboxymetholy-cellulose | | | | | | | | |
| Acrylate emulsion | | | | | | | | |
| Wetting agent | | | | | | | | |
| Copolymers and ethoxylates | x | x | x | x | x | x | | x |
| Ethoxylates | | | | | | | | |
| Alcylamine polyglycol | | | | | | | | |
| Release coating composition | | | | | | | | |

TABLE 1-continued

| Paper: | A | B | C | D | E | F | G | H |
|---|---|---|---|---|---|---|---|---|
| Silicone based coating | | | | | | | | |
| Wax based coating | x | x | x | x | x | x | x | x |
| Results | | | | | | | | |
| Print quality | ++ | ++ | — | + | + | — | + | ++ |
| Drying time | + | ++ | — | ++ | ++ | ++ | ++ | +++ |
| Adhesion base paper-coatings | ++ | ++ | ++ | ++ | ++ | ++ | ++ | ++ |
| Transfer yield | ++ | ++ | ++ | ++ | ++ | ++ | ++ | +++ |
| Hand | ++ | ++ | + | + | + | + | + | + |
| Fastness to wet rubbing | 4/5 | 4/5 | 4 | 3/4 | 5 | 2 | 3/4 | 4/5 |
| Fastness to dry rubbing | 4/5 | 4/5 | 5 | 4/5 | 4/5 | 4 | 4/5 | 5 |
| Fastness to laundering | 4/5 | 4/5 | 4/5 | 4 | 3 | 2/3 | 3 | 4/5 |
| Peel | easy | easy | easy | very easy | easy | very easy | easy | easy |

For the Paper A, the properties of the obtained textile product were as follows:
color fastness to wet rubbing according ISO Test Method 105-A03:1993: 4/5
color fastness to dry rubbing ISO Test Method 105-A03:1993: 5
color fastness to laundering ISO Test Method 105-A02:1993: 4/5
color fastness to light AATC 16.3:2012 Option 3: 4

The hand of the cotton substrate after printing was determined using the Fabric Touch Tester (FTT™ M293), commercially available from SDL Atlas LLC, USA, as described in Binti Haji Musa et al. (2018) Practical Considerations of the FTT Device for Fabric Comfort Evaluation. *J Fashion Technol Textile Eng* S4:003. As a comparison, the hand of the cotton substrate before transfer as well as after transfer using Jet-Pro® SoftStretch™, which is commercially available from Neenah, USA, was determined. The results are included in Table 2.

TABLE 2

| Grading (active and passive indices obtained by FTT) | | | | |
|---|---|---|---|---|
| Paper used for transfer printing | Smoothness | Softness | Warmth | Total Active and Passive Indices |
| Paper A (Passive) | 5.0 | 3.0 | 2.0 | 4.0 |
| Paper A (Active) | 3.0 | 3.0 | 2.0 | 3.0 |
| Cotton Substrate (Passive) | 4.0 | 3.0 | 2.0 | 3.0 |
| Cotton Substrate (Active) | 3.0 | 3.0 | 3.0 | 3.0 |
| Jet-Pro ® SoftStretch ™ (Passive) | 2.0 | 1.0 | 1.0 | 1.0 |
| Jet-Pro ® SoftStretch ™ (Active) | 2.0 | 1.0 | 3.0 | 1.0 |

From Table 2, it can be deduced that the Total Active and Passive Indices of the textile product obtained by Paper A negatively deviate with 0 point from the Cotton Substrate, while the same indices of textile product obtained by Jet-Pro negatively deviate from the Cotton Substrate by 4 points in total.

Example 2—Coating Weight

Pigment transfer sheets were prepared according to Recipe A as described in Example 1 having various coating weights as indicated in Table 2.

Next, an image was printed on each sheet with an inkjet printer and the image was transferred on a cotton substrate in a heat press set at 190° C. and 4 bar, i.e. 0.65 bar surface pressure, followed by peeling the base paper of the textile to provide a textile product. For each paper, the transfer yield and textile softness of the textile product was determined. The results are provided in Table 3.

TABLE 3

| | | | | | | |
|---|---|---|---|---|---|---|
| weight release coating [g/m$^2$] | 2 | 4 | 6 | 4 | 4 | 4 |
| weight transfer coating [g/m$^2$] | 12 | 12 | 12 | 8 | 12 | 16 |
| transfer yield [%] | 70 | 100 | 100 | 90 | 100 | 100 |
| textile softness | + | + | — | ++ | + | — |

Example 3—Pigment Transfer on Cotton Substrates Using a Calender

A pigment transfer sheet prepared according to Recipe A as described in Example 1, having a release coating of 4 g/m$^2$ and a transfer coating of 12 g/m$^2$ was used to provide an image on a cotton substrate using a calender.

Next, an image was printed on each sheet with an inkjet printer and the image was transferred on a cotton substrate in a transfer calender set at 190° C., 6 bar pressure, contact time 50 seconds, followed by peeling the base paper of the textile to provide a textile product. The transfer yield was low, color fastness to wet rubbing and color fastness to washing were too low, hand of the textile was good.

Example 4—Pigment Transfer on Cotton Substrates Using a Calender and a Pressure Impulse A pigment transfer sheet prepared according to Recipe A as described in Example 1, having a release coating of 4 g/m$^2$ and a transfer coating of 12 g/m$^2$ was used to provide an image on a cotton substrate using a calender.

Next, an image was printed on each sheet with an inkjet printer and the image was transferred on a cotton substrate in a transfer calender set at 190° C., 6 bar pressure, 5 bar surface pressure impulse applied at the beginning of the transfer process, contact time 50 seconds, followed by peeling the base paper of the textile to provide a textile product. The transfer yield was 100%, color fastness to wet rubbing was 4/5 and color fastness to washing was good, hand of the textile was good.

Example 5—Pigment Transfer on Cotton Substrates Using a Calender and a Pressure Impulse A pigment transfer sheet prepared according to Recipe A as described in Example 1, having a release coating of 4 g/m$^2$ and a transfer coating of 12 g/m$^2$ was used to provide an image on a cotton substrate using a calender.

Next, an image was printed on each sheet with an inkjet printer and the image was transferred on a cotton substrate in a transfer calender set at 190° C., 6 bar pressure, 5 bar surface pressure impulse applied at the end of the transfer process, contact time 50 seconds, followed by peeling the base paper of the textile to provide a textile product. The transfer yield was 100%, color fastness to wet rubbing was 2 and color fastness to washing was clearly lower to the results from the example 4, hand of the textile was good.

Comparative Example 6—Pigment Transfer on Cotton Substrate Using Conventional Transfer Papers and a Calender and a Pressure Impulse An image was printed on Jet-Pro® SoftStretch™ with an inkjet printer and the image was transferred on a cotton substrate in a transfer calender set at 190° C., 6 bar pressure, 5 bar surface pressure impulse applied at the beginning of the transfer process, contact time 50 seconds, followed by peeling the base paper of the textile to provide a textile product. The transfer yield was 100%, color fastness to wet rubbing was 4 and color fastness to washing was 4, hand of the textile was very poor.

Comparative Example 7—Pigment Transfer on Cotton Substrate Using Conventional Transfer Papers and a Calender An image was printed on Jet-Pro® SoftStretch™ with an inkjet printer and the image was transferred on a cotton substrate in a transfer calender set at 190° C., 6 bar pressure, contact time 50 seconds, followed by peeling the base paper of the textile to provide a textile product. The transfer yield was 100%, color fastness to wet rubbing was 4 and color fastness to washing was 4, hand of the textile was very poor.

Example 8 Pigment Transfer Sheet—Sticking/Blocking Tendency

Pigment transfer sheets were prepared according to the recipes B and H as described in Example 1. Next the sheets were stored as piles and additional pressure was applied on the surface of each pile. The pigment transfer sheets prepared according to recipe B showed clearly lower tendency to stick to each other and to block compared to the pigments transfer sheets prepared according to recipe H. The silicon dioxide pigments in the transfer layer help preventing the pigment transfer sheets to stick to each other or to block.

The invention claimed is:

1. A process for transferring an image from a pigment transfer sheet to a textile substrate to provide a textile product carrying said image, said process comprising:

providing a pigment transfer sheet comprising a base layer and a coated transfer layer with a printed image of pigments on said transfer layer;

a superimposing step comprising superimposing the pigment transfer sheet and the textile substrate by contacting the transfer layer with the textile substrate a transfer step comprising calendaring that comprises applying pressure and heat to the superimposed contacted transfer sheet and textile substrate; and a peeling step comprising separating the base layer from the textile substrate and at least part of the transfer layer, wherein applying said pressure in the transfer step comprises applying a surface pressure of at least 0.40 bar, wherein said calendaring comprises applying a base pressure and a pressure impulse, which pressure impulse is a temporary increase in pressure compared to the base pressure, and wherein the pressure impulse is provided by one or more lamination cylinders and/or one or more feeding cylinders.

2. The process according to claim 1, wherein the superimposed contacted transfer sheet and textile substrate are heated in the transfer step to a temperature in the range of 100 to 250° C.

3. The process according to claim 1, wherein the superimposed contacted transfer sheet and textile substrate are heated and pressed in the transfer step for a time in the range of 10 to 90 seconds.

4. The process according to claim 1, wherein the base layer is separated from the textile substrate in the peeling step at an elevated temperature.

5. The process according to claim 1, wherein said process further comprises a stretching step after the peeling step, said stretching step comprising stretching the textile substrate.

6. The process according to claim 1, wherein said pressure impulse is applied within the first half time period of the transfer step, wherein the pressure impulse is a temporary increase in pressure during the first half of the transfer step.

7. The process according to claim 1, wherein the pigment transfer sheet comprising a base layer and a transfer layer, wherein the transfer layer is in an amount in the range of 5 to 20 g/m2.

8. A textile comprising an image obtainable in accordance with claim 1, said textile having at least one of the following properties:

hand as determined by FTT and as expressed by the Total Active and Passive Indices deviating negatively in total at most 3 points from the original textile substrate;

color fastness to rubbing according to ISO Test Method 105-A03:1993 of 3 or more, and/or a dry rubbing cloth of 3 or more;

color fastness to laundering according to ISO Test Method 105A2:1993 of 3 or more;

color fastness to light according to AATCC 16.3:2012, Option 3 of 3 or more.

9. A pigment transfer sheet suitable for transferring an image to a textile substrate in a process according to claim 1, said transfer sheet comprising a base layer and a transfer layer, said transfer layer being present in an amount of 5 to 25 $g/m^2$.

10. The pigment transfer sheet according to claim 9, wherein said transfer layer comprises textile reactive polymers.

11. The pigment transfer sheet according to claim 10, wherein said textile reactive polymers comprise isocyanate textile reactive groups.

12. The pigment transfer sheet according to claim 9, further comprising a release layer that is positioned between the base layer and the transfer layer.

13. The pigment transfer sheet according to claim 9, comprising three or less layers.

14. The pigment transfer sheet according to claim 9, which is composed such that said textile product can be obtained having at least one of the following properties:

hand as determined by FTT and as expressed by the Total Active and Passive Indices deviating negatively in total at most 3 points from the original textile substrate;

color fastness to rubbing according to ISO Test Method 105-A03:1993 of 3 or more and/or a dry rubbing cloth of 3 or more;

color fastness to laundering according to ISO Test Method 105A2:1993 of 3 or more;

color fastness to light according to AATCC 16.3:2012, Option 3 of 3 or more.

15. The process according to claim 7, wherein the transfer layer comprises textile reactive polymers.

16. The process according to claim 15, wherein the textile reactive polymers comprise cross-linkable polymers.

17. The process of claim 16, wherein the textile substrate comprises natural fibers, wherein the natural fibers are selected from the group consisting of cotton, viscose, silk, coir, flax, hemp, jute, ramie, sisal, mohair, cashmere, camel hair and wool, or combinations thereof.

18. The pigment transfer sheet according to claim 10, wherein said textile reactive polymers comprise cross-linkable polymers.

* * * * *